United States Patent [19]

Hickman et al.

[11] Patent Number: 5,102,607
[45] Date of Patent: Apr. 7, 1992

[54] METHOD FOR MOLDING PRODUCTS WITH UNDERCUT REGIONS

[75] Inventors: Michael O. Hickman; Jack F. Campbell, both of Guelph, Canada

[73] Assignee: GSW Inc., Toronto, Canada

[21] Appl. No.: 641,051

[22] Filed: Jan. 14, 1991

[51] Int. Cl.$^5$ .............................................. B29D 11/00
[52] U.S. Cl. ................................. 264/318; 249/145; 425/577; 425/DIG. 58
[58] Field of Search ...................... 425/577, DIG. 58; 249/145; 264/318

[56] References Cited

U.S. PATENT DOCUMENTS

| | | | |
|---|---|---|---|
| 3,898,014 | 8/1975 | Meister et al. | 415/56.6 |
| 4,115,505 | 9/1978 | Metabi | 264/318 |
| 4,502,659 | 3/1985 | Stephenson et al. | 425/DIG. 58 |
| 4,565,518 | 1/1986 | Altman et al. | 264/318 |

Primary Examiner—David A. Simmons

[57] ABSTRACT

A method provides a mold for producing a product where the product includes material over an undercut opening in the product. The mold comprises first and second mold sections which open and close relative to one another and the first mold section in itself includes mold parts which open and close relative to one another. The mold is arranged such that when the first and second mold sections are closed, the mold parts of the first mold section are also closed to define a mold cavity between the mold sections and further including a cavity region for forming the material over the undercut opening between the mold parts of the first mold section. The mold then opens in a manner in which the first and second mold sections are opened which then allows the mold parts of the first mold section to open for releasing the product from the mold.

1 Claim, 5 Drawing Sheets

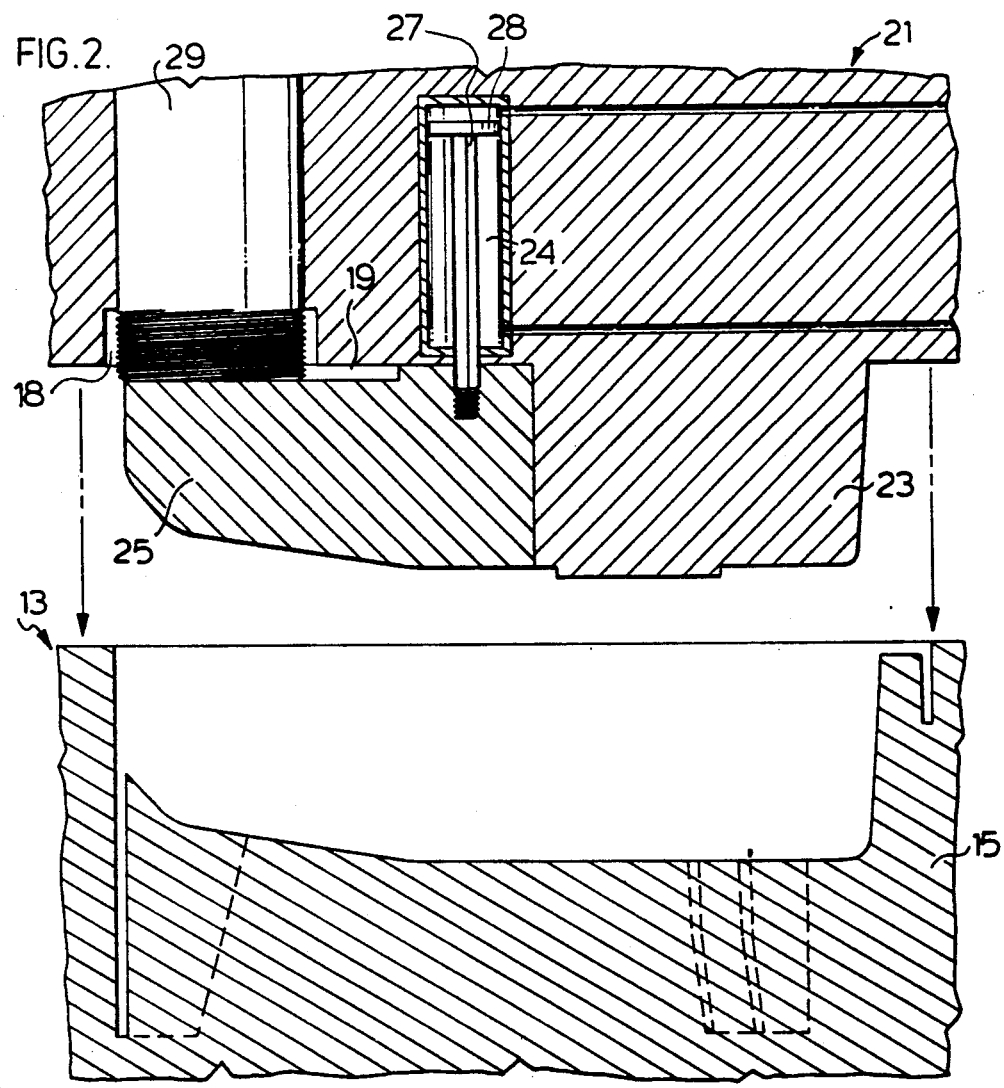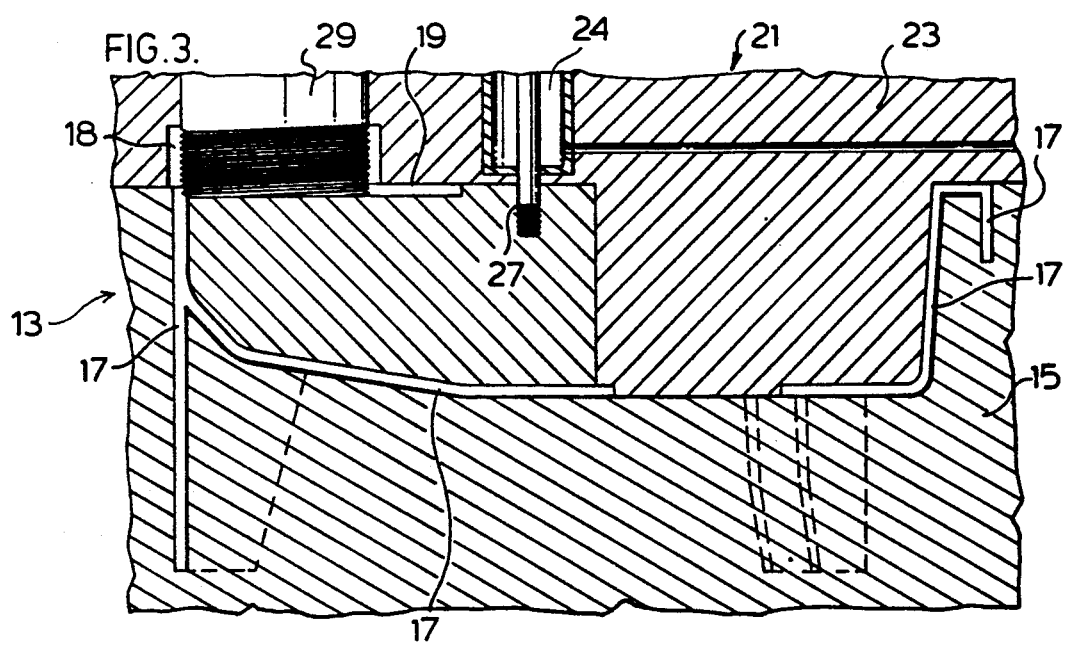

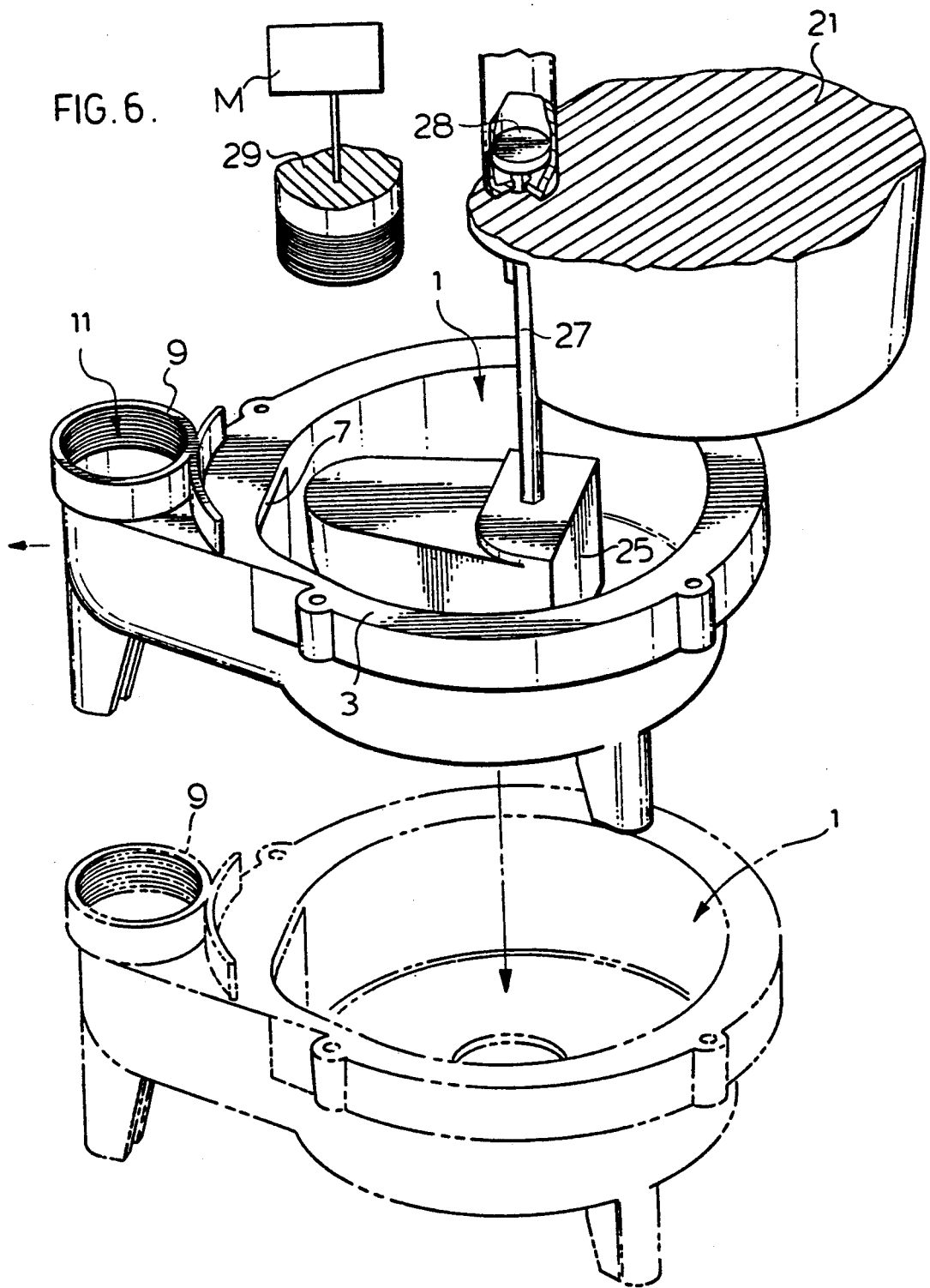

METHOD FOR MOLDING PRODUCTS WITH UNDERCUT REGIONS

FIELD OF THE INVENTION

The present invention relates to a method and apparatus for molding a product having an undercut opening in the product.

BACKGROUND OF THE INVENTION

To date, it has been very difficult to mold any product having an undercut opening. The difficulties occur because the mold parts or opens in a direction at right angles to the material in the product covering the undercut opening. Therefore, in a standard mold arrangement the mold part around which the undercut opening would be formed, would catch on the material covering the undercoat opening and prevent the mold from opening.

The present invention relates to a method of molding a product having a first opening bordered by a wall around the first opening and a second opening through the wall at generally right angles to the first opening. The second opening is undercut beneath a ledge of rigid material formed on the product. The product is formed in a mold having first and second mold sections which open and close at a first parting line and the first mold section in itself comprises first and second mold parts which open and close at a second parting line. The method comprises closing the first and second mold sections to define a mold cavity, portions of which run along each of the first and second parting lines to define a mold cavity at the first and second parting lines. The mold cavity defined at the second parting line extends between only one of the mold parts and the second mold section. The method further consists of flowing mold material into the mold cavity, setting the mold material in the mold and thereafter opening the first and second mold sections and opening the first and second mold parts in a direction consistent with the direction of opening of the first and second mold sections and finally releasing the product from between the first and second mold parts.

BRIEF DESCRIPTION OF THE DRAWINGS

The above as well as other advantages and features of the present invention will be described in greater detail according to the preferred embodiments of the present invention in which;

FIG. 2 is a sectional view through a mold when in the open position for molding the product shown in FIG. 1;

FIG. 3 is a sectional view through the mold of FIG. 2 when closed and prior to the injection of mold material into the mold;

FIG. 6 is perspective view showing the final releasing of the product from the mold parts of the first mold section.

DETAILED DESCRIPTION ACCORDING TO THE PREFERRED EMBODIMENTS OF THE PRESENT INVENTION

Figure 1:
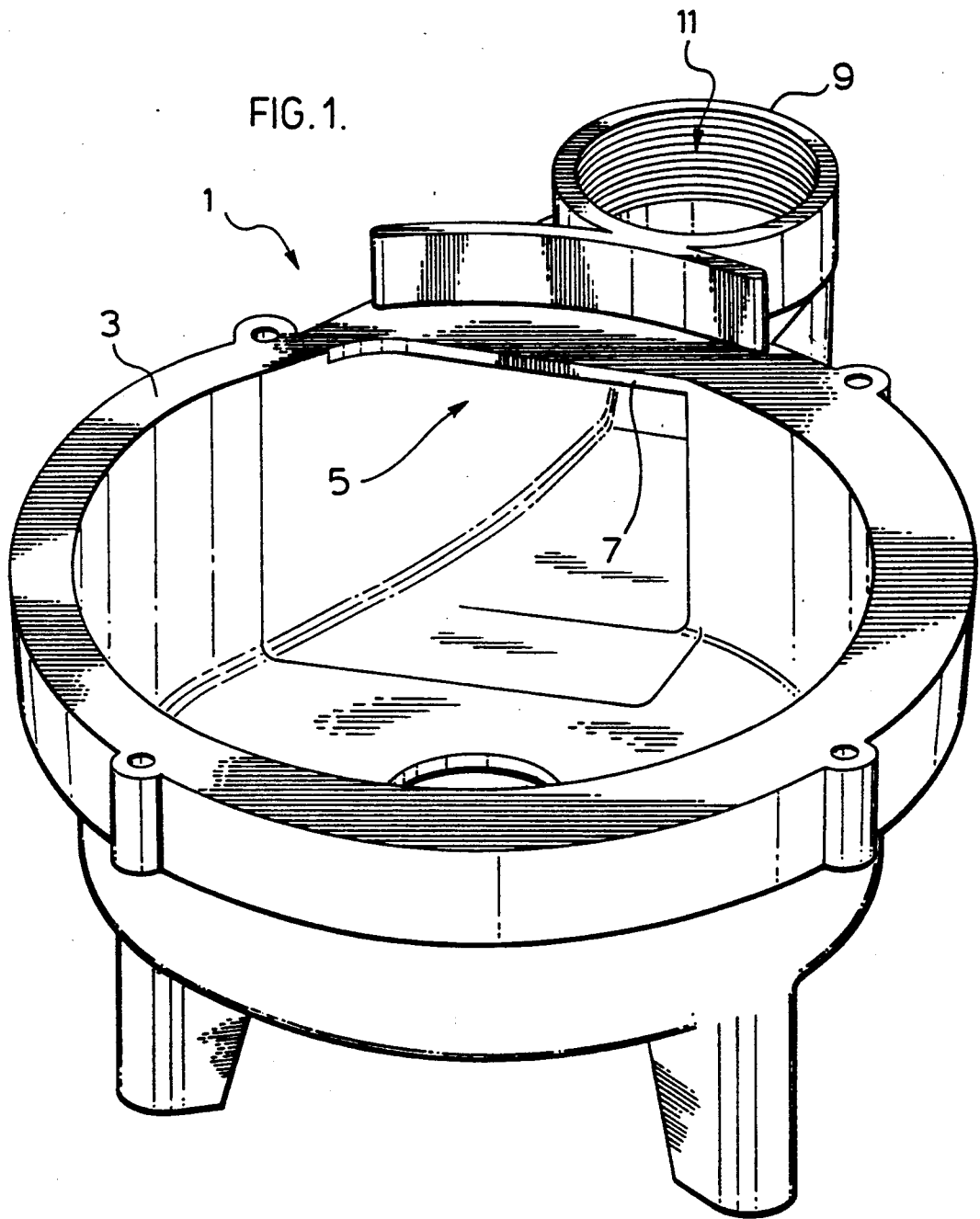
FIG. 1 is a perspective view of a product molded with an undercut opening according to a preferred embodiment of the present invention.

FIG. 1 shows a molded product and in particular a volute generally indicated at 1 for use in a pump. This volute is molded from plastic material using the mold to be described with respect to FIG. 2 through 6 of the drawings.

Volute 1 has a main body portion indicated at 3 including the lower legs on the volute. Provided in the main body portion 3 of the volute is an undercut region or opening generally indicated at 5 and covered by a horizontal ledge of material 7. In this particular design, the undercut region is opened to both sides of the horizontal ledge including not only the opening indicated at 5, but additionally including an opening generally indicated at 11 defined by a threaded portion 9 of the volute.

As will be appreciated, a standard mold could not be used to form the volute 1 since the mold part around which the undercut region is formed would be trapped by the ledge 7 in the undercut region and prevent opening of the mold.

Figure 4:
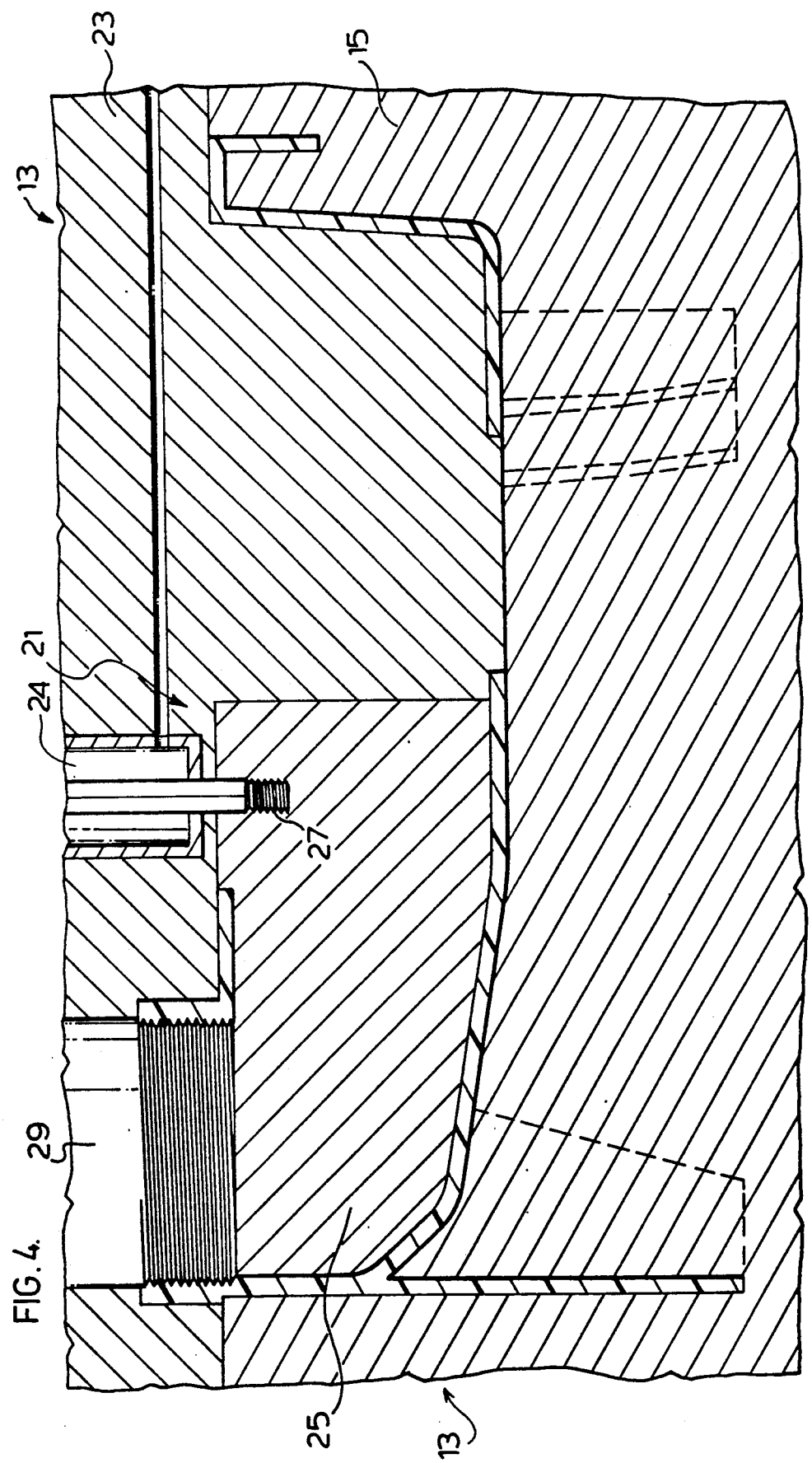
FIG. 4 is view similar to FIG. 3 after the injection of the molding material into the mold.

The present invention provides a mold generally indicated at 13 shown in FIGS. 2 through 4 of the drawings for forming volute 1 with its undercut region.

Mold 13 includes a first mold section generally indicated at 21 and a second mold section 15. These two mold sections open and close with respect to one another and when closed define a mold cavity, i.e. an open area into which flowable plastic mold material is injected to form the volute. The mold cavity includes the open area 17 between the first and second or upper and lower mold sections as well as open areas 18 and 19 which will be described later in detail.

Although the drawings show and lower mold sections in practice, these mold sections actually operate in a front to back manner opening horizontally rather than vertically in accordance with standard molding practices.

The first mold section 21 comprises a main mold part 23 and a secondary mold part 25 which opens and closes or separates relative to the main mold part 23. Main mold part 23 includes a sliding pin 27 having an enlarged head 28 slideably secured within a channel 24 within the main mold part. The end of pin 27 extends into and is secured within secondary mold part 25 as shown in the drawings.

In addition, the first mold section includes a further mold part 29 which is used for the formation of the threads in volute portion 9.

As seen in FIGS. 2 and 3 of the drawings, the mold cavity region 19 referred to above is located between the main mold part 23 and the secondary mold part 25 of the first mold section. The mold cavity region 18 is located outwardly around mold part 29.

Figure 5:
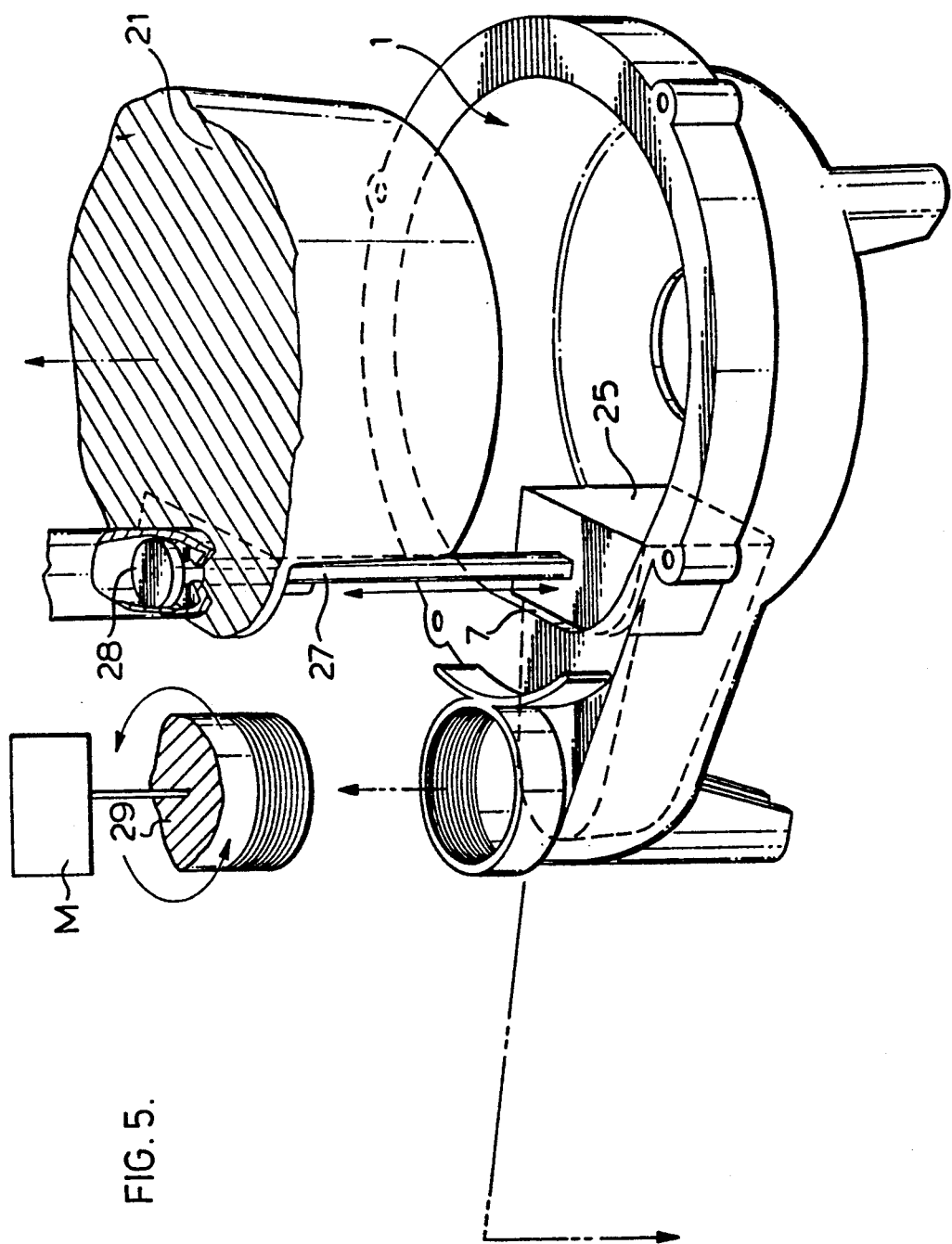
FIG. 5 is a perspective view of the product after opening of the two mold sections just prior to releasing the product from the mold parts of the first mold section.

In the operation of the mold, the two mold sections are closed with one another from the FIG. 2 to the FIG. 3 position. From here the plastic in the liquid state is injected into the mold cavity including open regions 17, 18 and 19 as shown in FIG. 4 of the drawings. The plastic hardens and forms the shape of the volute. The mold is then opened by separating mold sections 21 and 15 from one another. At the same time, ejector pins which are standard in the art but which are not shown push on the volute which has been formed in mold section 21 which causes mold parts 23 and 25 to open at the same time as the two mold sections are opened relative to one another. In addition, mold part 29 is threaded out of the volute by means of a motor M as shown in FIG. 5 of the drawings.

As the two mold parts 23 and 25 are opened, pin 27 is pulled to its outermost position relative to channel 24 which provides sufficient clearance between mold parts 23 and 25 to then allow mold part 25 to be removed from the undercut region in the volute as shown in FIG. 6 of the drawings.

The inclusion of pin 27 provides a guide for the reclosing of the mold parts in the first mold section which occurs automatically as the first and second mold sections are closed relative to one another. Note as shown in the drawings, and as best seen in FIG. 5, that pin 27 has an off roumd and in this case a rectangular cross section that prevents any twisting or rotation between mold parts 23 and 25 so that when the mold closes these two parts are always properly aligned with one another.

It will now be seen how the provision of multiple mold parts in one of the mold sections where those multiple mold parts open and close relative to one another allows the molding of products with an undercut opening in a very simple operation.

Although various preferred embodiments of the invention have been described in detail, it will be appreciated that variations may be made thereto without departing from the spirit of the invention or the scope of the appended claims.

The embodiments of the invention in which an exclusive property or privilege is claimed are defined as follows:

1. A method of molding a rigid product having a first opening bordered by a wall around the first opening and a second opening through the wall at generally right angles to the first opening, the second opening being undercut beneath a ledge of rigid material formed on the product, the product being formed in a mold having first and second mold sections which opens and close at a first parting line and the first mold section in itself comprising first and second mold parts which open and close at a second parting line, said method comprising closing said first and second mold sections and said first and second mold parts to define a mold cavity at said first and second parting lines, the mold cavity at said second parting line extending between only one of the mold parts and the second mold section, flowing mold material into the mold cavity, setting the mold material in the mold, opening the first and second mold sections and opening the first and second mold parts in a direction consistent with the direction opening of the first and second mold sections, and releasing the product from between the first and second mold parts.

* * * * *